United States Patent [19]

Yasuhara et al.

[11] Patent Number: 5,250,886
[45] Date of Patent: Oct. 5, 1993

[54] METHOD OF CONTROLLING ROBOT AND ROBOT CONTROL APPARATUS

[75] Inventors: Masateru Yasuhara, Kawasaki; Katsumi Ishihara, Tokyo; Toshihiro Yamamoto, Yokohama, all of Japan

[73] Assignee: Canon Kabushiki Kaisha, Tokyo, Japan

[21] Appl. No.: 902,499

[22] Filed: Jun. 23, 1992

Related U.S. Application Data

[63] Continuation of Ser. No. 742,073, Aug. 7, 1991, abandoned, which is a continuation of Ser. No. 457,885, Dec. 27, 1989, abandoned.

[30] Foreign Application Priority Data

Dec. 27, 1988 [JP] Japan ................................. 63-327660
Dec. 27, 1988 [JP] Japan ................................. 63-327661

[51] Int. Cl.⁵ ............................................. G06B 19/00
[52] U.S. Cl. ............................. 318/567; 318/568.14; 318/568.13; 901/2; 395/85; 395/86
[58] Field of Search ................................ 318/560-646; 395/88-99; 901/2, 3, 5, 8-22

[56] References Cited

U.S. PATENT DOCUMENTS

| | | | |
|---|---|---|---|
| 4,178,632 | 12/1979 | Anthony | 318/568.14 X |
| 4,308,584 | 12/1981 | Arai | 364/513 |
| 4,385,358 | 5/1983 | Ito et al. | 364/513 |
| 4,529,921 | 7/1985 | Moribe | 318/568.13 |
| 4,546,443 | 10/1985 | Oguchi et al. | 901/20 X |
| 4,553,077 | 11/1985 | Brantmark et al. | 901/2 X |
| 4,594,670 | 6/1986 | Itoh | 318/632 X |
| 4,625,285 | 11/1986 | Mori et al. | 364/513 |
| 4,683,543 | 7/1987 | Hirasawa et al. | 364/513 |
| 4,706,204 | 11/1987 | Hattori | 364/513 |
| 4,757,459 | 7/1988 | Lauchnor et al. | 318/568.14 X |
| 4,831,548 | 5/1989 | Matoba et al. | 364/513 |

*Primary Examiner*—Paul Ip
*Attorney, Agent, or Firm*—Fitzpatrick, Cella, Harper & Scinto

[57] ABSTRACT

In a method of storing teaching points of a robot, when teaching points for a plurality of moving units are input, information for identifying the moving units associated with the teaching points is input, and the teaching points and the identification data are stored in a single area of a memory.

18 Claims, 8 Drawing Sheets

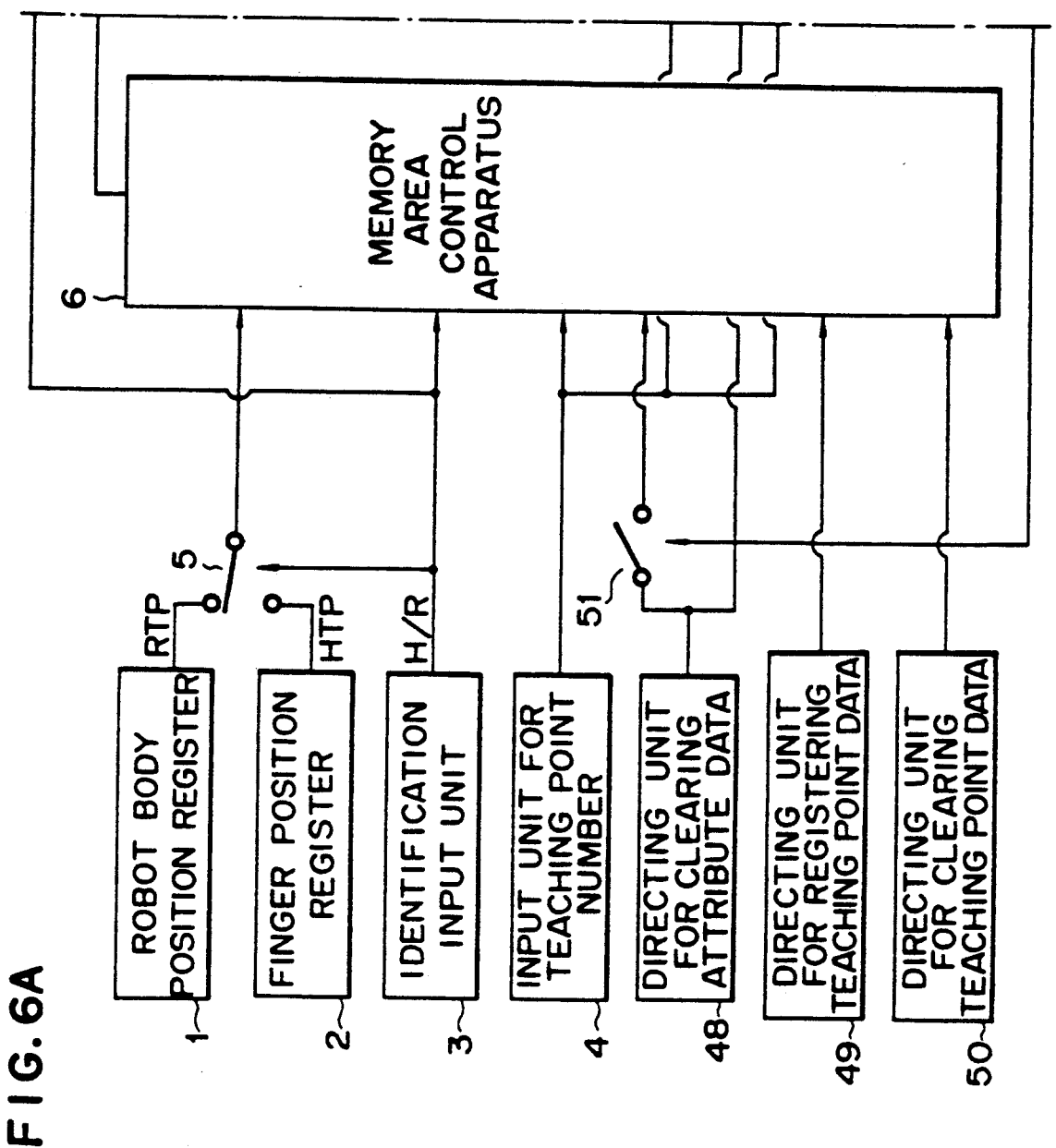

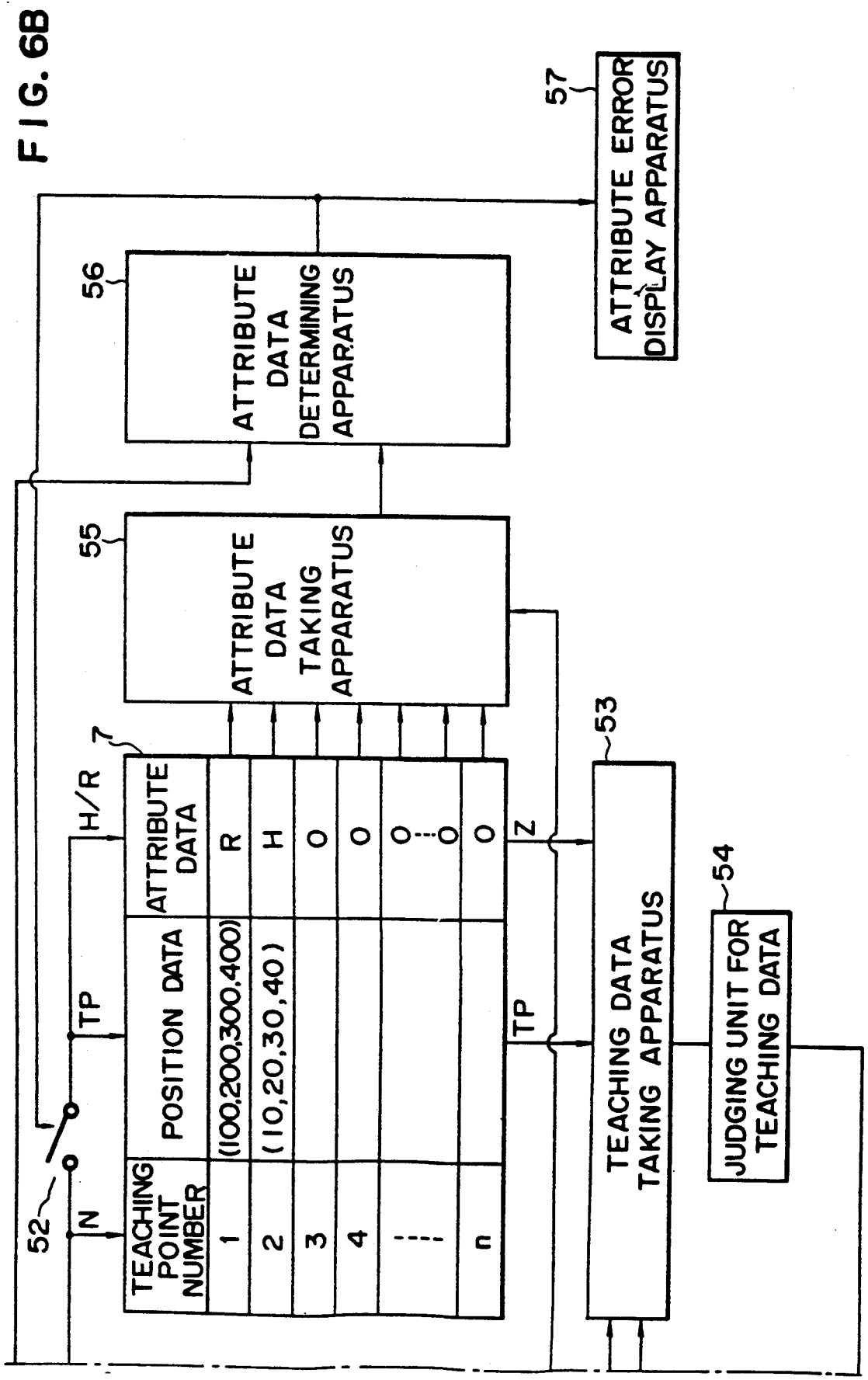

METHOD OF CONTROLLING ROBOT AND ROBOT CONTROL APPARATUS

This application is a continuation of application Ser. No. 07/742,073 filed Aug. 7, 1991, now abandoned, which is a continuation of Ser. No. 07/457,885 filed Dec. 27, 1989, now abandoned.

BACKGROUND OF THE INVENTION

1. Field of the Invention

The present invention relates to a method of storing teaching points of a robot having different moving units such as a finger, an arm, and the like, and a robot control apparatus for controlling a robot in accordance with these teaching points.

2. Related Background Art

A robot ordinarily has a plurality of movable units or moving units or objects to be controlled (to be referred to as control objects hereinafter). For example, such control objects include a robot body unit (e.g., a multi-joint arm), and a finger unit (e.g., a finger rotatable in the axial direction of the arm). In this case, since both the arm and finger must be controlled, the moving direction of the arm and the rotational direction of the finger must be closely related to each other. In general, both control objects are controlled by a single control apparatus. Conventionally, in order to control a plurality of control objects, a single control apparatus stores teaching points of these control objects in predetermined memory areas.

However, in the prior art, since the teaching points of the control objects are classified by only memory areas, a teaching point of an extra control object cannot be stored in an area together with predetermined areas for the control objects.

No identification data for identifying control objects is attached to the teaching points for the control objects.

For this reason, if the wrong control object is directed, for example, when a teaching point of the finger unit is directed in a moving command of the robot body unit, the robot body unit is moved to a point indicated by the teaching point data of the finger unit. As a result, a work or a robot (body) may be damaged.

In a test process for robot control, the following case frequently occurs, for example, when it is determined that the stored teaching point data of, e.g., the arm, is offset from a desired position, the teaching point data must be changed slightly.

However, in a changing process, since an operator cannot identify a storage position of the teaching point data, he often changes a teaching point of the finger although he wants to change a teaching point of the arm. Normally, the operator cannot notice this error at that time, and notices it after the robot is erroneously moved. However, this erroneous operation results in damage to the robot.

SUMMARY OF THE INVENTION

It is an object of the present invention to provide a robot control apparatus, and a method of controlling a robot, which can eliminate the conventional drawbacks.

It is another object of the present invention to provide a method of storing teaching points of a robot, with which teaching points of a plurality of control objects can be stored to be identified in correspondence with the control objects, and a robot control apparatus for controlling a robot using the stored teaching points.

It is still another object of the present invention to provide a method of storing teaching points of a plurality of control objects without errors, and a robot control apparatus for controlling a robot using the stored teaching points.

It is still another object of the present invention to provide a method of controlling a robot and a robot control apparatus, which can prevent a robot from being damaged due to erroneous teaching.

The above and other objects of the present invention will be apparent from the detailed description taken in conjunction with the accompanying drawings and appended claims.

BRIEF DESCRIPTION OF THE DRAWINGS

FIG. 6A and 6B together is a view for explaining the principle of the embodiment of the present invention.

DETAILED DESCRIPTION OF THE PREFERRED EMBODIMENTS

An embodiment of a control apparatus for a robot comprising a robot body unit and a finger unit, to which the present invention is applied, will be described below with reference to the accompanying drawings.

Figure 2:
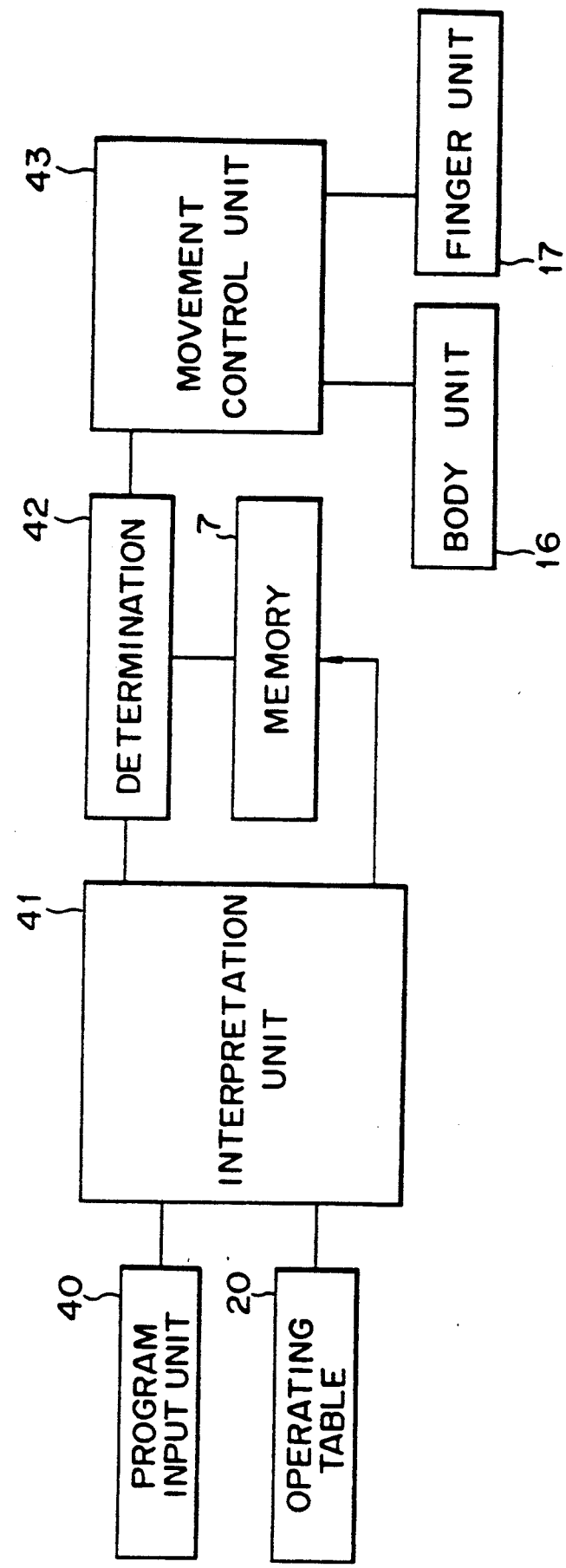
FIG. 2 is a block diagram of a robot control apparatus to which the present invention is applied.
Figure 3:
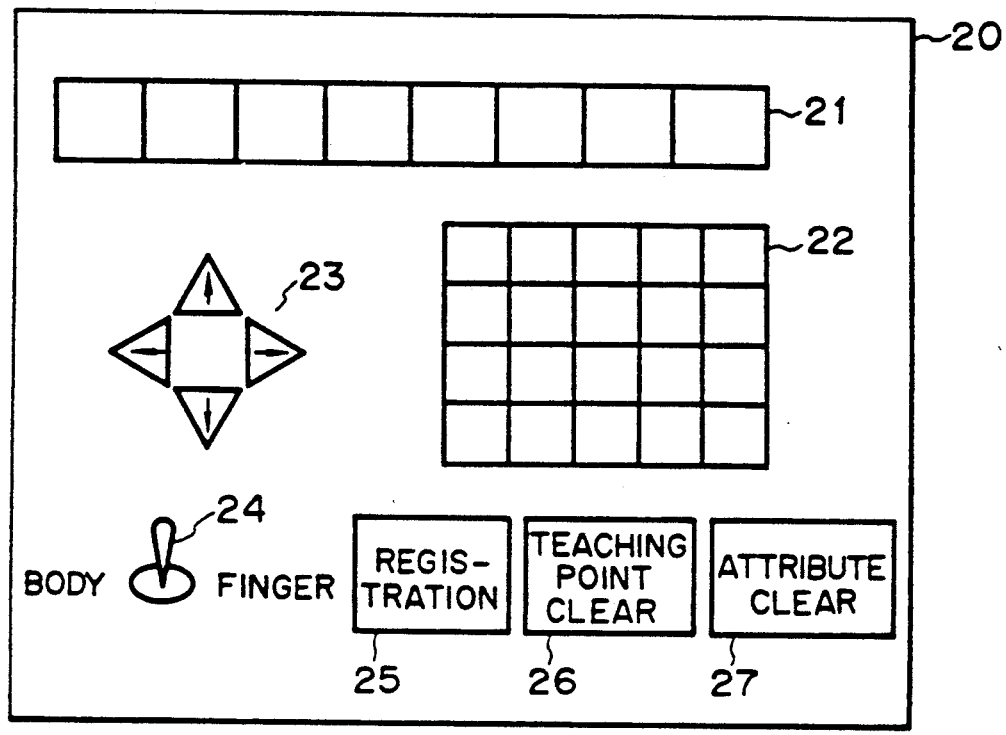
FIG. 3 is a top view of an operating table used in this embodiment.

FIG. 2 shows an embodiment of a robot system. In FIG. 2, a program input unit 40 inputs a program shown in, e.g., FIG. 4. This program is interpreted by an interpretation unit 41. An operating table 20 is arranged as shown in FIG. 3, and has a function of inputting a command for registering a teaching point, and a function of inputting a simple movement command. A command input from the operating table 20 is also interpreted by the interpretation unit 41. A plurality of teaching points input from the operating table are registered in a memory 7. In actual registration of the teaching points, a plurality of teaching points are registered in turn for the finger unit and the robot body unit.

A determination unit 42 determines whether or not a movement command does not conflict with an attribute of a teaching point. A movement control unit 43 executes only a command which is determined by the determination unit to have no confliction.

Figure 4:
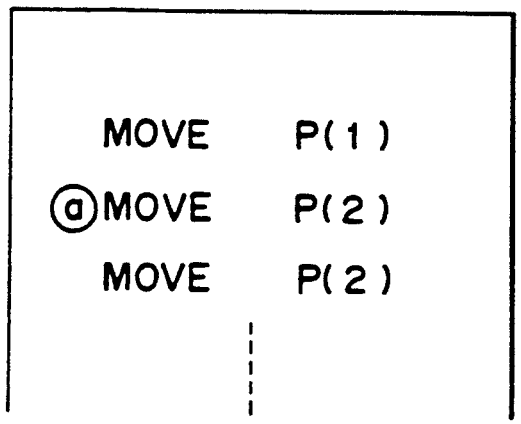
FIG. 4 is a view showing an example of a program used in this embodiment.

FIG. 4 shows an example of a program input by the program input unit 40. All commands described in the program are movement commands (MOVE). A @ mark in front of MOVE indicates a movement command to the finger unit. That is, a movement command without a @ mark is interpreted as one to the robot body unit. P(1) or the like means a teaching point registered in the memory 7. The teaching points are stored in the memory 7 in the form of a table of P(N). Note that N is an index number of a teaching point. One teaching point data consists of position data TP and attribute data Z. The position data TP consists of four data of X, Y, Z, and θ directions, and the attribute data Z includes data for identifying the robot body unit or the finger unit. In this embodiment, as the attribute data, "R" is given to direct the robot body unit, and "H" is given to direct the finger unit.

FIG. 3 shows an outer appearance of the operating table 20. The operating table 20 includes a display unit 21 having a plurality of display digits, a ten-key pad 22 for inputting a teaching point number N, direction keys 23 for directing a moving direction of the robot body unit or the finger unit, a switch 24 for directing movement of the robot body unit or the finger unit, a key 25 for directing registration of a teaching point including an attribute in the memory 7, a clear key 26 for clearing only the teaching point data TP registered in the memory 7, and a key 27 for directing clearing of only the attribute data Z in the memory 7.

Figure 1A:
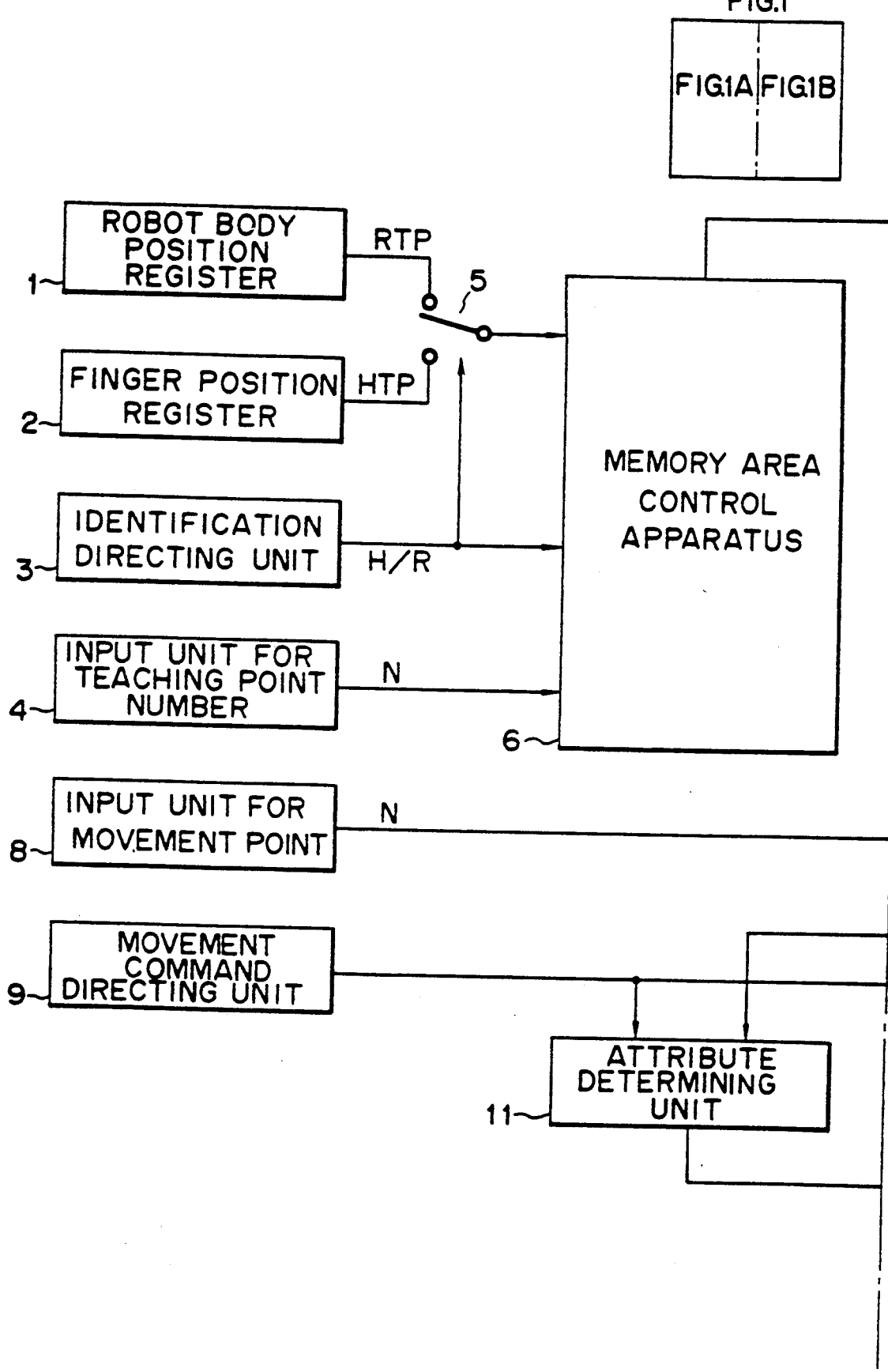
FIGS. 1A and 1B together is for explaining the principle of an embodiment of the present invention.
Figure 1B:
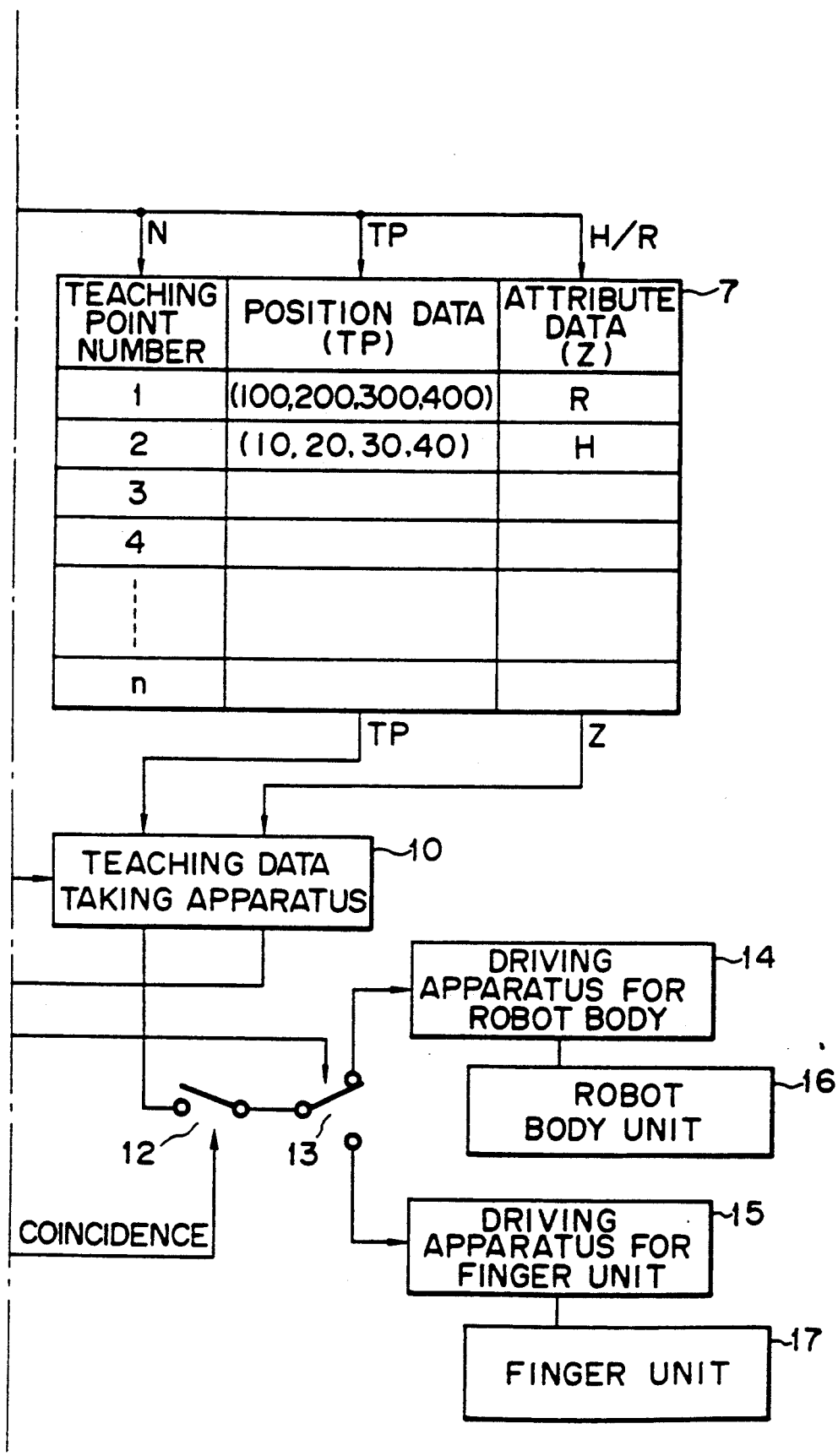

FIG. 1 best illustrates the feature of this embodiment. In FIG. 1, a robot body position register 1 holds position data RTP of the robot body unit, and a finger position register 2 stores position data HTP of the finger unit. The position data of each of the robot body unit and the finger unit consists of four data, as described above. These position registers are arranged in the operating table 20. An identification directing unit 3 directs data H/R for identifying teaching point data of the finger unit or the robot body unit, which is to be registered or to which a movement command is to be issued. The unit 3 corresponds to the switch 24 shown in FIG. 3. An input unit 4 for a teaching point number directs the teaching point number N, and corresponds to the ten-key pad 22 shown in FIG. 3. A switch 5 switches inputs from the position data registers in accordance with the data H/R.

The system shown in FIG. 1 also includes a memory area control apparatus 6, and the memory 7 for storing teaching point data. This memory has a table of P(N) as described above.

An input unit 8 for a movement point inputs a teaching point number for directing one of the registered points as a destination of movement, and corresponds to the ten-key pad shown in FIG. 3. A movement command directing unit 9 issues a movement command, and corresponds to the keys 23 and the switch 24 (FIG. 3) or the program command (FIG. 4).

A teaching point data taking apparatus 10 extracts teaching point data having a number designated by the input unit 8. An attribute determining unit 11 determines whether or not attribute data read out from the memory coincides with attribute data in a command, and corresponds to the determination unit 42 shown in FIG. 2. A switch 12 turns on/off transmission of position data read out from the memory 7 to a driving apparatus side. A switch 13 switches a destination to which position data is supplied. The system also includes driving apparatuses 14 and 15 respectively for the body unit and the finger unit.

A case will be described below wherein teaching point data of the robot body unit is stored and registered.

An operator designates a teaching point number to be stored using the input unit 4 (or the ten-key pad 22). The operator designates the identification directing unit 3 (or the switch 24) that the teaching point to be input is one for the robot body unit. Upon this designation, a data switch 5 is switched to connect the data RTP of the robot body position register 1 to the memory area control apparatus 6. At the same time, data "R" as a symbol indicating an attribute that the teaching point data is one for the robot body unit is set to be attribute data on the basis of the data H/R from the identification directing unit 3 (or 24). In this manner, the memory area control apparatus 6 stores the teaching point data TP and the attribute data Z supplied from the data switch 5 at a position in the memory 7 corresponding to the number N directed by the input unit 4.

Subsequently, a case will be described below wherein teaching data of the finger unit is stored. The operator directs using the identification directing unit 3 that teaching point data to be stored is one for the finger unit. Position data of the finger unit is stored as teaching point data, and data "H" indicating that the teaching point data is one for the finger unit is stored as the attribute data by the same operations as described above.

Upon repetition of these operations, registration of teaching points in the memory is completed. A checking operation when the robot is moved according to teaching points registered in the memory 7 will be described below.

Once teaching points P(N) are registered in memory 7, all the movement commands from the program input unit 40 or the operating table 20 are checked by the determination unit 42 (FIG. 2). When a command is a movement command from operating table 20, the checking operation is performed in a hardware manner by, e.g., the attribute determining unit 11 or the like. When a command is a program command, as shown in FIG. 4, the checking operation is performed in a software manner in accordance with procedures shown in FIG. 5.

The determination checking operation by the system shown in FIG. 1 will be described below.

A case will be described below wherein teaching point data (N=1) of the robot body unit is directed by a movement command of the finger unit in an operation wherein the robot is moved to a prestored teaching point on the basis of a movement command from the operating table 20. First, data indicating that the movement command is one for the finger unit is supplied from the movement command directing unit 9 (corresponding to 24 in FIG. 3) to the attribute determining unit 11. At the same time, the switch 13 is switched to the driving apparatus 15 side in response to this data. The teaching point data taking apparatus 10 extracts teaching point data P(N) from the memory 7 on the basis of number data N (=1) of a teaching point supplied from the input unit 8. The extracted position data TP is supplied to the driving apparatus designated by the switch 13 through the switch 12. The attribute determining unit 11 compares an attribute of the movement command and the attribute data Z of the teaching point data. In this case, the attribute of the movement command indicates the finger unit, and the attribute data Z of the teaching point data P(1) indicates the robot body unit. Therefore, the determination result of the unit 11 indicates a noncoincidence. As a result, the position data switch 12 is turned off. Therefore, no position data is supplied to the driving apparatus, thereby preventing an erroneous operation.

On the other hand, when the attribute of the movement command coincides with the attribute data Z of the teaching point data, the switch 12 is closed, and the position data TP extracted from the memory 7 by the teaching point data taking apparatus 10 is supplied to the driving apparatus through the switch 13 which is switched based on the attribute of the movement command, thus allowing an operation.

Figure 5:
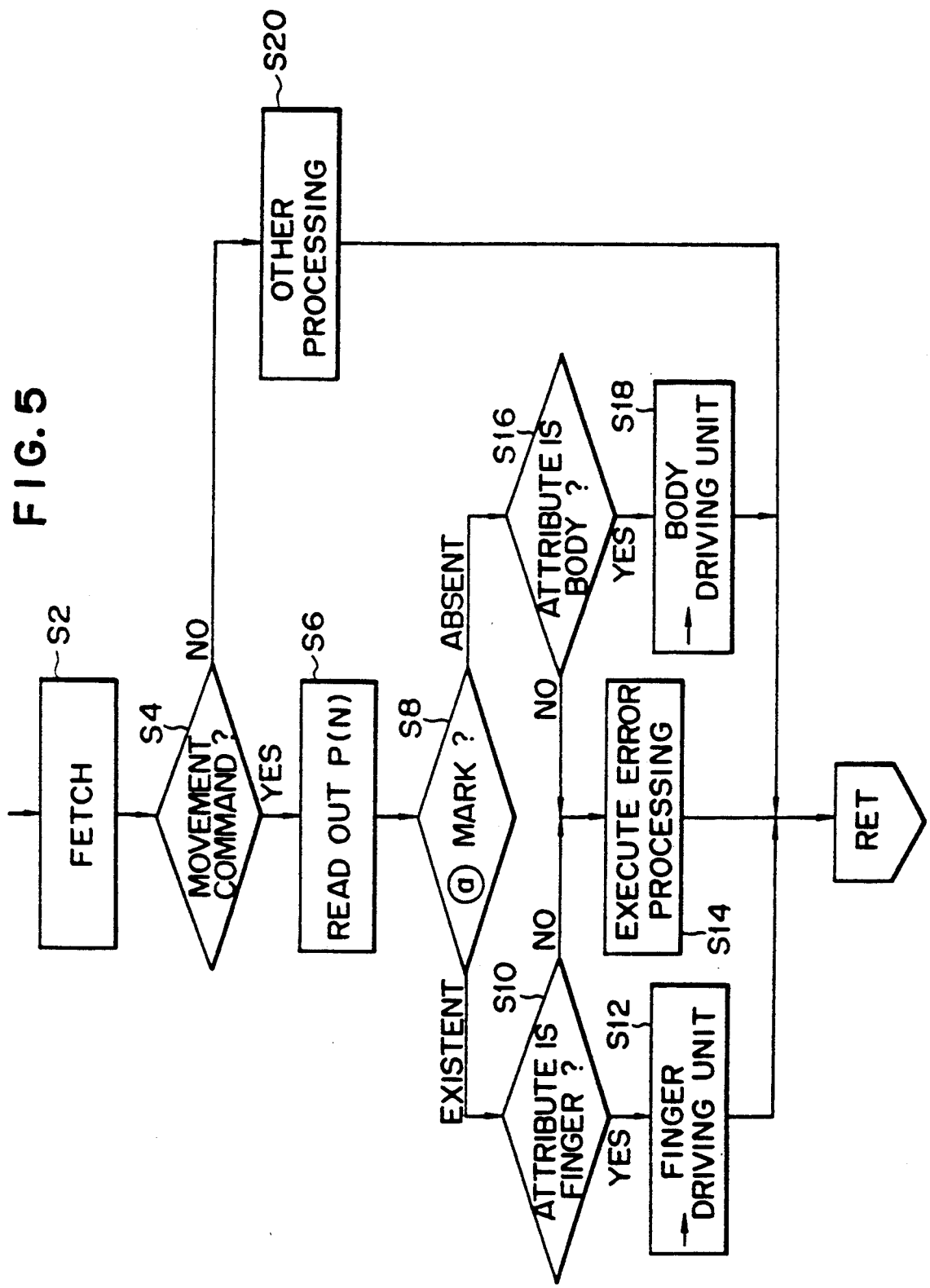
FIG. 5 is a flow chart showing control procedures when an identification checking operation of a command is performed.

If the input command is a program command, the interpretation unit (FIG. 2) performs the checking operation shown in FIG. 5. In FIG. 5, a program command is fetched in step S2. It is checked in step S4 to see if the fetched command is the MOVE command. If YES in step S4, TP and Z are read out from memory 7 in accordance with P(N) in the MOVE command. It is checked in step S8 to see if the @ mark is appended to the command. If it is determined in step S8 that the @ mark is appended, the fetched command is one for the finger unit; otherwise, it is one for the robot body unit. Thus, in step S10 or S16, the presence/absence of the @ mark is compared with the attribute Z. If a noncoincidence is found, since the command is an error and error processing is executed in step S14. However, if a coincidence is found, the command is sent to the finger unit in step S12 or is sent to the robot body unit in step S18, and movement control is performed.

With the apparatus of this embodiment, an area for storing an attribute is allocated in a memory area for storing teaching points of a robot, so that teaching point data of both the robot body unit and the finger unit can be stored in a single memory area, and can be distinguished from each other. Therefore, for example, the robot body unit can be prevented from erroneously using teaching point data of the finger unit. Thus, the robot can be prevented from damage.

Various changes and modifications of the present invention may be made within the spirit and scope of the invention. For example, the attribute codes are not limited to "R" and "H" but may be, e.g., numerals. In place of appending the attribute code, the memory 7 may be divided into areas, so that teaching point numbers 1 to n are assigned to the finger unit, and teaching point numbers n+1 to N are assigned to the body unit. Then, this number can be collated with the data H/R as identification data from the identification directing unit 3.

In the robot above embodiment, the robot comprises the body unit and the finger unit. However, the present invention can be applied to any other robots if they comprise a plurality of moving units.

A case will be described below wherein position data in the memory 7 is changed.

FIG. 6 is a block diagram of a circuit for changing position data. In FIG. 6, components 1 to 7 are the same as those in FIG. 1.

In FIG. 6, write access of memory 7 is allowed only when a switch 52 is closed since write data TP and H/R are supplied to the memory 7 through the switch 52. The switch 52 is closed only when an attribute data determining apparatus 56 determines that attribute data read out from memory 7 coincides with data H/R input from the input unit 3, as will be described later.

The system shown in FIG. 6 includes a directing unit 48 for clearing attribute data Z in an attribute data field in the memory 7 (corresponding to the key 27 shown in FIG. 3), a directing unit 49 for registering teaching point data (corresponding to the key 25 in FIG. 3), and a directing unit 50 for clearing a teaching point data field in the memory 7 (corresponding to the key 26 in FIG. 3). The attribute data determining apparatus 56 determines whether or not data H/R input from the identification input unit 3 coincides with attribute data Z input from an attribute data taking apparatus 55. The output result of the attribute data determining apparatus is displayed on an attribute error display apparatus 57.

The attribute data field Z in the memory 7 can store three types of values, i.e., "R", "H", and "0". "R" and "H" imply that teaching points for the robot body unit and the finger unit are stored, as has been described above. When the value of Z is "0", this means that no teaching point is stored in this area, and one of the body unit and the finger unit can be stored. More specifically, the output from the determining apparatus 56 goes to "1" and the switch 52 is closed:

(1) when the value of the field Z read out by the attribute data taking apparatus 55 is "0"; or
(2) when the readout value of the field Z is "H" and the signal H/R from the identification input unit 3 indicates "H"; or
(3) when the readout value of the field Z is "R" and the signal H/R from the identification input unit 3 indicates "R".

Figure 7:
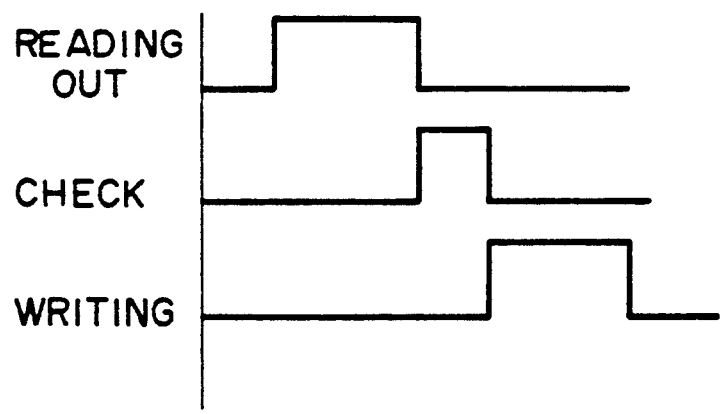
FIG. 7 is a chart for explaining a registration sequence of teaching point data.

In the apparatus shown in FIG. 6, a sequence for registering a teaching point is divided into three cycles, as shown in FIG. 7, i.e., an attribute data reading out cycle by the taking apparatus 55, a checking cycle by the determining apparatus 56, and a writing cycle by the switch 52.

When a new teaching point is registered, since the determining apparatus 56 outputs "1", the switch 52 is closed, the signal H/R from the input unit 3 is stored in the attribute data field, and data RTP or HTP selected in accordance with the signal H/R is written in the position data field of the memory 7 through the switch 5.

When teaching point data of the robot body unit is changed, an operator designates the teaching point number of data to be changed using the input unit 4. The operator then designates using the identification input unit 3 that the designated data is teaching point data of the robot body unit. Upon this designation, the switch 5 is switched to connect the data RTP of the robot body position register 1 to the memory area control apparatus 6. The attribute data taking apparatus 55 extracts attribute data Z of teaching point data of the number N indicated by the input unit 4, and sends it to the attribute data determining apparatus 56. The attribute data determining apparatus 56 compares the two input attribute data to determine whether or not the two data coincide with each other.

An operation performed when the two attribute data coincide with each other will be described below. When the two attribute data coincide with each other, the output from the attribute data determining apparatus 56 goes to "1" to indicate a coincidence, and a mode for registering teaching point data to be changed is set, and the content RTP of the robot body position register is registered in a data area of the memory 7 of the designated teaching point number.

An operation performed when the two attribute data do not coincide with each other will be described below. When the attribute data Z extracted from the memory 7 by the attribute data taking apparatus 55 is one for the finger unit, a signal indicating a noncoincidence is output from the attribute data determining apparatus 56. In response to this output, the switch 52 is turned off, and write access of the memory 7 is inhibited, thus disabling the registration mode. At the same time, in response to this output, the attribute data display apparatus 57 is driven to acknowledge a noncoincidence of attribute data to an operator, and the data is not registered.

An operation for clearing a teaching point will be described below. The system shown in FIG. 6 includes a switch 51 for switching validity/invalidity of a clear instruction from the directing unit 48, a teaching data taking apparatus 53 for extracting teaching point data of the number N designated by the input unit 4, and a judging unit 54 for judging whether or not teaching point data is cleared.

Since the clearing operation of the teaching point data is a kind of changing operation, operations of the identification input unit 3 and the input unit 4 are required in addition to the directing unit 50 to attain the clearing operation. In the reading out cycle, attribute data of an area indicated by the teaching point number N is read out, and is compared with the signal H/R from the identification input unit 3. Only when the two data coincide with each other, data "0" output from the control apparatus 6 is written in an area of N in the memory 7 as the position data TP.

When attribute data is to be cleared, the operations of the input unit 4 and the directing unit 48 are required. With the operations of these units, teaching point data in an area indicated by the input teaching point data N is read out by the taking apparatus 53, and the judging unit 54 judges whether or not the readout content is "0", i.e., if the data has already been cleared by the teaching point data clearing operation. If the judging unit 54 judges that the data has already been cleared, the switch 51 is closed, and an attribute data clear instruction is issued to the control apparatus 6. As a result, data "0" is output from the control apparatus 6 as attribute data, and is written in the attribute data area of the area indicated by the teaching point number N. In this manner, the attribute data can be changed.

According to this embodiment, means for changing teaching points of a robot can be switched between one for the robot body unit and one for the finger unit, and attribute data of a teaching point is judged to inhibit registration of data having a wrong attribute. As a result, an erroneous registration of, e.g., position data of the robot body unit in a teaching point storage area of the finger unit can be prevented, and hence, the finger unit can be prevented from erroneously using position data of the robot body unit. Thus, the robot can be prevented from a damage.

A changing operation of attribute data is allowed after two operations, i.e., a clearing operation of teaching point data, and a clearing operation of attribute data, thus achieving data protection.

What is claimed is:

1. A method of storing teaching points of a robot, said method comprising the steps of:
 a) inputting index information for discriminating a teaching point to be input;
 b) inputting identification data representative of with which of a plurality of moving units of the robot the teaching point to be input is associated;
 c) inputting position information of the teaching point to be input, and temporarily storing the input position information in a register; and
 d) reading out the position information stored in the register and providing correspondence between the read out position information, the index information input in the step (a) and the identification data input in the step (b) to store them into a storage area of storage means independent of a kind of moving unit.

2. A method according to claim 1, wherein the plurality of moving units include an arm unit and a hand unit of said robot.

3. A method according to claim 1, wherein the step (c) temporarily stores the position information into a storage area of the register corresponding to the identification data input in the step (b), and wherein the step (d) reads out the position information from the storage area of the register corresponding to the identification data input in the step (b).

4. A robot control apparatus comprising:
 a plurality of control objects;
 first input means for inputting index information for discriminating teaching points of said plurality of control objects;
 designation means for designating one of said plurality of control objects;
 generating means for generating identification data for identifying the control object designated by said designation means;
 second input means for inputting position information of a teaching point;
 storage means for storing the position information input by said second input means; and
 storage control means for providing correspondence between the index information input by said first input means, the identification data generated by said generating means and the position information input by said second input means and for storing them into a storage area of said storage means independent of a kind of control object.

5. An apparatus according to claim 4, wherein said plurality of control objects includes an arm unit and a hand unit of a robot.

6. An apparatus according to claim 4, further comprising a register for temporarily storing the position information input by said second input means into a storage area corresponding to the control object, and wherein said storage control means reads out the position information from the storage area of said register corresponding to the control object designated by said designation means and stores the read out position information into said storage means.

7. A robot control apparatus comprising:
 a plurality of control objects;
 storage means for storing teaching points which indicate the position of said control objects and identification data which identify respectively the control objects corresponding to the teaching points, the teaching point and the identification data corresponding thereto being stored as a set in a common area of said storage means independent of a kind of control object corresponding to the teaching point;
 command means for commanding a positioning operation of a desired control object using a command including the identification data of the desired control object and designating data for selecting the teaching point; and
 control means for reading out the teaching point and the identification data from said storage means in accordance with the designating data of the teaching point, and for, when the readout identification data coincides with the identification data in the command, allowing the desired control object to be moved to a position of the readout teaching point and, when the readout identification data does not coincide with the identification data in the command, performing an error processing routine.

8. An apparatus according to claim 7, wherein said plurality of control objects include an arm unit and a hand unit of a robot.

9. An apparatus according to claim 7, wherein said command means comprises means for interpreting the command.

10. An apparatus according to claim 7, wherein said command means comprises means for manually inputting an instruction for moving said plurality of control objects.

11. A method of storing teaching points of a robot, comprising the steps of:
   a) inputting new teaching point data in storage means, in which has been stored teaching point data for positioning a plurality of control objects and identification data which identify respectively the control objects corresponding to the teaching points, to modify the teaching point data that has been stored in the storage means;
   b) inputting area data representing an area of said storage means in which the new teaching point data input in the step (a) is to be stored;
   c) inputting identification data for identifying the control object of the new teaching point data input in the step (a); and
   d) enabling a storage operation of the new teaching point data input in the step (a) when the identification data in the storage means corresponding to the area data input in the step (b) coincides with the identification data input in the step (c) and performing an error processing routine when the identification data in the storage means corresponding to the area data input in the step (b) does not coincide with the identification data input in the step (c).

12. A method according to claim 11, wherein each area of said storage means includes a first field for storing the teaching point data and a second field for storing the identification data, and
   when the second field is empty, a storage operation of the teaching point data input in the step (a) and the identification data input in the step (c) is enabled.

13. A method according to claim 12, wherein when the identification data is already stored in said second field, and when the identification data input in the step (c) coincides with the identification data stored in said second field, a storage operation of the teaching point data input in the step (a) is enabled.

14. A method according to claim 11, wherein said plurality of control objects include an arm unit and a hand unit of a robot.

15. A robot control apparatus comprising:
   a plurality of control objects;
   storage means, in which has been stored teaching point data for positioning said plurality of control objects and identification data which identify respectively the control objects corresponding to the teaching points, said storage means having areas assigned in correspondence with said plurality of control objects;
   input means for inputting teaching point data of said plurality of control objects together with area data indicating a storage area of the teaching point data and identification data for identifying the corresponding control object; and
   control means for, when identification data in said storage means corresponding to the area data input by said input means coincides with the identification data input by said input means, enabling a storage operation of the teaching point data input by said input means in said storage means and, when the identification data in said storage means corresponding with the identification data input by said input means, performing an error processing routine.

16. An apparatus according to claim 15, wherein each area of said storage means includes a first field for storing the teaching point data, and a second field for storing the identification data,
   said apparatus further comprises judging means for judging whether or not said second field is empty, and
   said control means enables a storage operation of the teaching point data and then identification data input by said input means when said judging means judges that said second field is empty.

17. An apparatus according to claim 15, wherein said plurality of control objects include an arm unit and a hand unit of a robot.

18. An apparatus according to claim 16, further comprising means for clearing a content of said second field.

* * * * *

UNITED STATES PATENT AND TRADEMARK OFFICE
CERTIFICATE OF CORRECTION

PATENT NO. : 5,250,886
DATED : October 5, 1993
INVENTOR(S) : MASATERU YASUHARA, ET AL.

It is certified that error appears in the above-identified patent and that said Letters Patent is hereby corrected as shown below:

COLUMN 1

Line 35, "with" should read --with the--.
Line 52, "a" should read --the--.

COLUMN 2

Line 16, "is for" should read --is a diagram for--.

COLUMN 5

Line 16, "since" should be deleted.
Line 41, "robot" (first occurrence) should be deleted.
Line 42, "the body" should read --the robot body--.

COLUMN 10

Line 28, "corresponding with" should read --corresponding to the area data input by said input means does not concide with--.

UNITED STATES PATENT AND TRADEMARK OFFICE
CERTIFICATE OF CORRECTION

PATENT NO. : 5,250,886
DATED : October 5, 1993
INVENTOR(S) : MASATERU YASUHARA, ET AL.

It is certified that error appears in the above-identified patent and that said Letters Patent is hereby corrected as shown below:

COLUMN 10

Line 39, "then" should read --the--.

Signed and Sealed this

Seventeenth Day of May, 1994

Attest:

BRUCE LEHMAN

Attesting Officer

Commissioner of Patents and Trademarks